United States Patent [19]

Sadler

[11] 4,307,495
[45] Dec. 29, 1981

[54] HOSE CLAMP

[76] Inventor: Charlton Sadler, P.O. Box 446, Brooksville, Fla. 33512

[21] Appl. No.: 135,433

[22] Filed: Mar. 31, 1980

[51] Int. Cl.³ .................... B65D 63/00; F16L 33/00
[52] U.S. Cl. ........................... 24/274 R; 24/20 R; 24/20 TT; 24/275; 24/279
[58] Field of Search ............ 24/274 R, 275, 274 WB, 24/276, 278, 279, 16 R, 20 R, 20 TT, 20 CW, 20 W, 280; 29/513

[56] References Cited

U.S. PATENT DOCUMENTS

| | | | |
|---|---|---|---|
| 1,824,199 | 9/1931 | Donohoe | 24/20 R |
| 1,986,748 | 1/1935 | Pritchard | 24/279 |
| 3,100,327 | 8/1963 | Spector | 24/274 R |
| 3,195,204 | 7/1965 | McKown, Jr. | 24/274 R |
| 3,286,314 | 11/1966 | Oetiker | 29/513 |
| 3,293,709 | 12/1966 | Holton | 24/20 TT |
| 3,296,674 | 1/1967 | Meshulam | 29/513 |
| 3,371,392 | 3/1968 | Rueckheim | 24/274 R |
| 3,398,440 | 8/1968 | Bergstrom | 24/274 R |
| 3,401,437 | 9/1968 | Christophersen | 24/274 WB |
| 3,691,601 | 9/1972 | Hough | 29/513 |
| 3,771,891 | 11/1973 | Nirenski et al. | 24/274 R |

FOREIGN PATENT DOCUMENTS

| | | | |
|---|---|---|---|
| 1123890 | 10/1956 | France | 24/274 R |
| 612631 | 11/1948 | United Kingdom | 24/274 R |

Primary Examiner—Victor N. Sakran
Attorney, Agent, or Firm—Frijouf, Rust, Stein & Pyle

[57] ABSTRACT

A hose clamp wherein the slotted strap portion is cut to a desired clamp size from a stock supply length. The clamp provides a housing for the two ends of the cut portion. Projections carried by the housing permit a first end of the strap to be removably engaged with the housing. A second member, preferably the second end of the strap, fills the space above the attached first end to interfere with the movement of the first end off the projection. Thus the assembly of a cut strap portion and a drive housing can be accomplished without tools.

10 Claims, 14 Drawing Figures

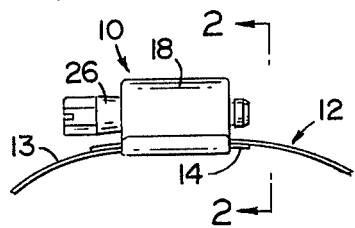
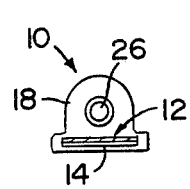
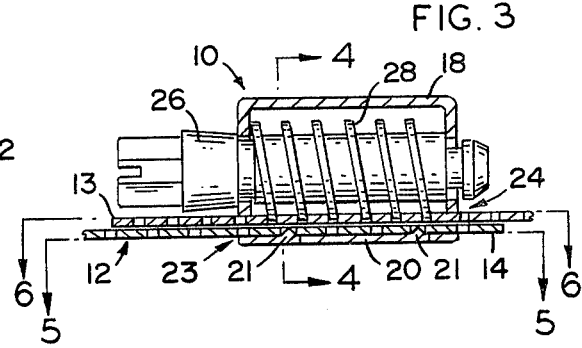
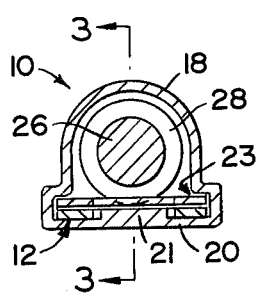
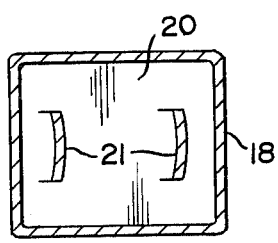
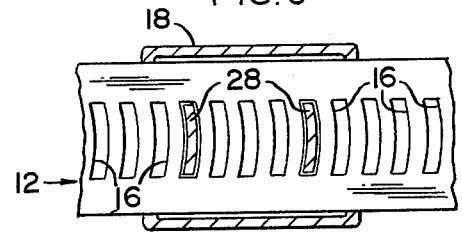
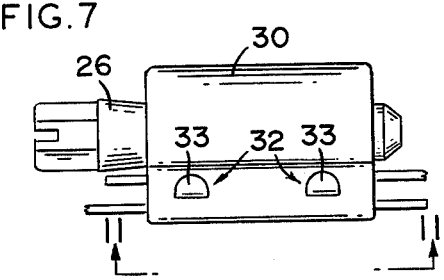
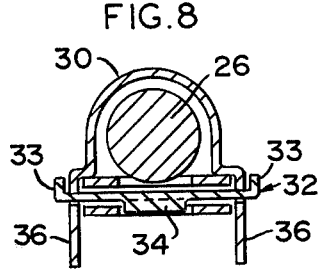
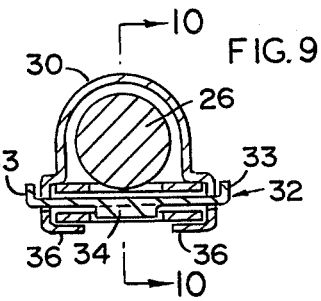
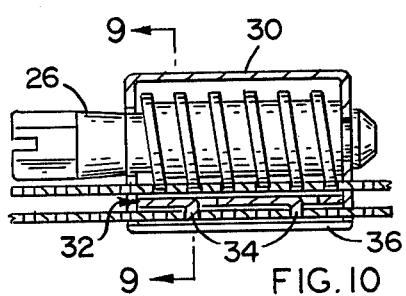
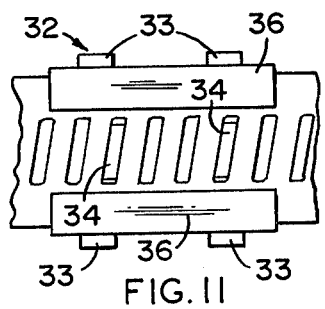
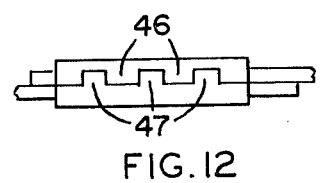
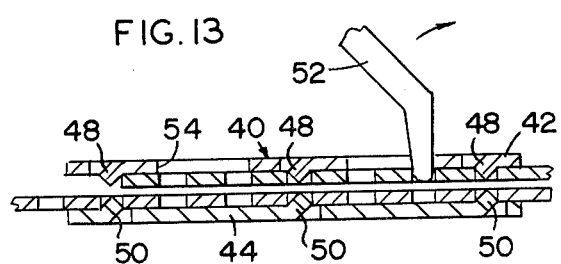
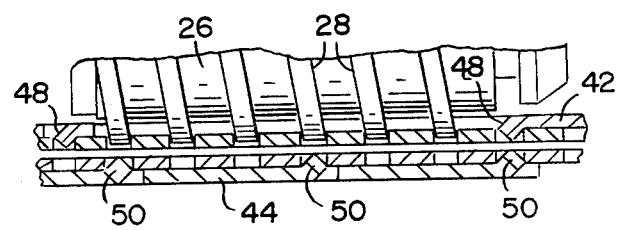

HOSE CLAMP

BACKGROUND OF THE INVENTION

1. Field of the Invention

This invention relates to the art of constricting a strap about an object, for example, a hose clamp method and apparatus. Specifically, the invention is directed to the object of inventory reduction and availability of proper size clamps wherein a specific length is cut from strap metal, one end of the cut is inserted and secured to a drive assembly body and the second end drawn in a counter direction by the drive body.

2. Description of the Prior Art

The prior art devices are well known to those who are mechanically inclined and knowledgeable of hardware items. They are put in inventory by the manufacturer in various strap sizes, with one end secured to a drive body and the other end normally temporarily engaged with the drive apparatus for convenience of display. The size selection is made and the worm head of the device reversed to release the end of the strap if that is necessary, or at least increase the diameter of the clamp if that is all that is necessary. Then, when the clamp is placed in position with respect to the workpiece, the worm is driven, usually by a screwdriver, to drive one end of the strap relative to the other.

The disadvantage of this inventory method is that invariably the size needed is not in stock and won't be in until sometime later.

A preliminary study of the references available in the U.S. Patent and Trademark Office was conducted by a professional searcher. That searcher was instructed that this invention relates to a hose clamp method and apparatus wherein the consumer will cut the proper length of stainless steel band and affix a worm drive gear assembly to the stainless steel band. The invention envisions a variety of embodiments, all of which can be used with the continuous stainless steel band and the worm drive mechanism, and one mechanism without a worm drive.

The search produced only three patents, and those are not particularly pertinent. They are: U.S. Pat. Nos. 3,286,314; 3,296,674; and 3,691,601, of which the most pertinent is U.S. Pat. No. 3,296,674. This patent illustrates the method of affixing the worm drive unit to the stainless steel band by swaging or similar operation. It is specifically designed for swaging by using a hydraulic tool or similar apparatus. Although the present invention does show one step of one embodiment employing a crimping action, the assembly is distinctly foreign to the showing of the prior art reference.

Otherwise, the two remaining patents are directed to remote art and therefore this invention is unique and distinct insofar as the claimed concepts are concerned.

SUMMARY OF THE INVENTION

The subject matter of this invention is normally referred to as a hose clamp because of its frequent use in the automotive industry for clamping of radiator hoses or fluid lines in the power system. It finds wide use in other areas as well.

The function of this invention is to reduce inventory requirements for multi-size selection, but also for insuring the availability of any possible size requirement. There is no possibility for a particular size to be out of stock.

In the preferred embodiment of this invention, a continuous reel of strap material is mounted on a support stand for dispensing the desired length of the strap material. Dispensing may be measuring and severing with a hand tool, or may be automated by power driven devices which may dispense the desired length, even to the extent of counting the length of material dispensed and providing a trimmed end.

A supply of clamp bodies is then kept in inventory to grasp the extreme ends of the severed strap, draw those ends in opposite direction in overlapped position, to tighten the strap about the object being clamped.

Preferably, the strap material is punched with a series of through opening slots along the longitudinal axis of the strap, substantially as found in prior art devices of preassembled nature available on the market. The slots are normally of slightly curved nature because the clamp body is preferably a worm drive gear, also as normally found in prior art preassembled devices. Thus the threads of the worm drive fit the somewhat curved slots of the strap member to enable the flutes to drive the strap relative to the clamp.

This invention provides the body in such a manner that one end of the strap is insertable to the body and allowed to interlock with the body, dropping the slots onto tabs of the body. This prevents longitudinal withdrawal of the strap, although removal can be made by laterally slipping the strap off of the tabs and reversing the direction.

To prevent such removal of the strap, something must be provided for blocking such movement. In one embodiment, the body has a chamber of restricted depth. Insertion of the second end into the restricted depth of the chamber will block the space above the one end to serve that purpose. The worm drive engages the second end and thus assembly of the clamp is complete and not subject to disengagement.

Another embodiment provides for insertion of the strap and then clamping portions of the clamp body to capture the end of the strap in the body irrespective of the insertion of the second end in the body.

It is an object of this invention, therefore, to provide an endless spool of strap material of a given length greater than that of any normal single use; to sever and assemble the strap into a drive body which will capture one end of the strap; and then to draw and drive the second end to clamp the strap material about the work object.

The foregoing has outlined some of the more pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description describing the preferred embodiment in addition to the scope of the invention defined by the claims taken in conjunction with the accompanying drawings.

BRIEF DESCRIPTION OF THE DRAWINGS

For a fuller understanding of the nature and objects of the invention, reference should be had to the following detailed description taken in connection with the accompanying drawings in which:

FIG. 1 is a side elevation view of a worm drive gear assembly with two ends of a strap loop engaged therein;

FIG. 2 is an end of the device of FIG. 1 taken along a line 2—2 of FIG. 1;

FIG. 3 is a section enlarged section as compared with FIG. 1 and is taken along line 3—3 of FIG. 4;

FIG. 4 is a section taken along line 4—4 of FIG. 3;

FIG. 5 is a section taken along line 5—5 of FIG. 3;

FIG. 6 is a section taken along line 6—6 of FIG. 3;

FIG. 7 is a side elevational view of the second embodiment of the worm drive assembly;

FIG. 8 is an end view of the construction illustrated in FIG. 7;

FIG. 9 is a section along line 9—9 of FIG. 10;

FIG. 10 is a section taken along line 10—10 of FIG. 9;

FIG. 11 is a bottom view of the completed assembly shown in FIGS. 9 and 10;

FIG. 12 is an elevational view of a single use embodiment of the invention;

FIG. 13 is a longitudinal section through the clamp assembly of FIG. 12 illustrating the first step in the tightening process; and FIG. 14 is a second stage of clamping advancement.

Similar reference characters refer to similar parts throughout the several views of the drawings.

DETAILED DESCRIPTION

The drawings and this description disclose four embodiments selected to give a full and broad disclosure of the claimed invention. These show the versatility of the concept in the art of constricting a strap about an object. There are numerous alternatives and modifications which will suggest themselves from these three basic concepts. Two of the teachings are for a type of clamp which is removable and reusable by the provision of a worm screw drive means for drawing the ends of the strap in opposite directions and third is a one-time use device which cannot be reversed once it has been installed. The fourth is a hybrid having a temporary worm screw drive. The latter two devices will find use in clamping permanently bound containers such as those used in shipping merchandise, wherein the strap is simply cut and the binding discarded.

In FIG. 1, a clamp body 10 is shown as the means for drawing the second end of the strap in a direction opposite the axial direction of the first end of the strap.

Refer to FIG. 3. Here is shown a strap 12 which has been cut from a continuous stock supply. The resultant section therefor has been established with a finite first and second end 13 and 14, assembled with the clamp body 10. The strap 12 has curved through openings or slots as shown by the reference character 16 in FIG. 6.

The worm screw drive per se is a known device and therefore no particular description is given of its construction further than to show the side elevational view in FIG. 3. However, the shell in which the worm drive is mounted is indicated by the reference character 18. The shell 18 has a bottom wall 20 with tabs 21 angled from the bottom wall. The tabs 21 are sized, spaced and configured to engage with the through openings 16.

The shell 18 has opposed entrance ports 23 and 24. A first end 13 of the strap 12 is insertable into the port 23 to register a slot 16 with each provided tab 21. In FIG. 5, it in indicated that two such tabs 21 are provided, although one or more is a matter of design according to material and load requirements.

Then, in order to prevent the lateral movement of the first end 13 out of engagement with the tab 21, a means is provided for blocking the lateral movement of the first end 13 to separate the strap and body from the interlock condition. In the embodiment of FIG. 3, this means is in fact a second end 14 of the strap which is inserted through the opposite port 24 of the housing to fill the space available for lateral movement.

In order to install the second end 14, it is fed through the opening 24 and the worm gear, indicated by reference character 26, is turned to cause the flute 28 thereof to engage into the slots 16 and begin a worm screw drive of the second end into and through the shell 18, with the excess projecting out of the entrance port 23 above the first end 13 of the strap.

In FIG. 7, the shell is modified to provide an alternate selection of means to engage the first end 13 of the strap. In the FIG. 7 embodiment, the shell is indicated by the reference character 30. A separate retainer 32 is locked into the side wall of the shell 30 by means of extension lock ears 33 which are shown bent upwardly from the main body of the retainer in a locked condition in all of the figures of the drawing.

The retainer 32 has one or more lock tabs 34. In the illustration, two such tabs have been shown, but as before, the number selected will depend upon load factors and materials used.

The first end 13 of strap 12 is simply placed in position between the clinch walls 36 with the tabs 34 engaged in the appropriate slots 16. Then, a crimping tool, either a specially designed tool or a heavy lineman plier, is applied to bend the clinch walls 36 from the position shown in FIG. 8 to that shown in FIG. 9. Thus, the first end 13 of the strap 12 is locked into a position where there is a means, namely the clinch wall 36, for blocking lateral movement of the strap. Then the second end 14 of the strap 12 is inserted and engaged as formerly described with respect to the FIG. 1 embodiment.

FIGS. 12–14 illustrate a one-time use binder embodying the basic principles of this invention. In this embodiment, the shell 40 is a preformed wrap-around metallic form with interlocking teeth 46 and 47. As provided prior to installation, the teeth 46 and 47 are spaced in order to allow an insertability factor of the strap member into the chamber of the shell.

The shell, when fully assembled by a compression tool, comprises a top wall 42 and a bottom wall 44. The material of the shell may be relatively soft in order that closing of the teeth 46 and 47 into registration may be accomplished without springing separation. The softer metal will suffice because the stress will be in a longitudinal direction tending to separate the teeth along their interlock plane and hence their strongest resistance.

Tabs 48 projecting from the top wall 42 and tabs 50 from the bottom wall 44 are similar in construction and operation as for that described with respect to the foregoing figures and embodiments of the invention.

Therefore, the first end 13 of strap 12 and the second end 14 are inserted into the cavity of the shell 40 and the shell clinched together to unite the teeth 46 and 47. Thereafter, a special pry driver 52 is inserted into access slot 54 in the top wall 42 and by lever action will slide the second end 14 of the strap 12 along from tab to tab, springing and compressing the tabs as forward motion is attained, but interlocking and preventing reverse movement about the strap as the next slot of the strap is engaged. Note that the space is not completely filled by the strap ends. Hence, this embodiment of the invention may be installed for one-time use only, and the ends of the strap pulled relatively snug around the burden before clinching of the teeth 46 and 47. Thereafter, there is a quick and easy operation to set the second end 14 along as described until adequate clamping security has been obtained.

The FIG. 14 version is a temporary worm screw drive, not secured to the body 40. A clamp or mere hand pressure will hold the worm in place to drive the strap, rather than the pry bar 52.

It will thus be seen that the objects set forth above, among those made apparent from the preceding description, are efficiently attained, and since certain changes may be made in the above without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

The invention claimed is:

1. In the art of constricting a strap about an object by gripping one end of a strap of predetermined length in a holding device and progressively drawing the other end in a counter direction with respect to the one end, the improvement comprising:
   a strap having a first and second end and a regular series of through opening slots along the longitudinal axis thereof;
   a clamp body, first means carried by said body for providing an interlock of the body with at least one strap slot, said interlock by the first means establishing only a fixed relationship relative to the longitudinal axis of the strap;
   second means for blocking the lateral movement of the strap to separate the strap and body from the interlock condition;
   whereby any desired length of strap may be provided, and the first end of the strap inserted into the body and thereafter blocked against removal; and
   means for drawing the second end of the strap in a direction opposite the axial direction of the first end established in the interlocking condition to thereby fix the ends to said clamp body and provide a constricting draw of the strap.

2. An improvement in constricting of a strap member as defined in claim 1, wherein the clamp body includes a housing with a bottom wall and at least one tab angled from the bottom wall and with aligned opening ports to receive the strap, whereby the first end of the strap is insertable into one port to register a slot with each provided tab.

3. An improvement in constricting of a strap member as defined in claim 1, wherein the clamp body includes a housing with a bottom wall and at least one tab angled from the bottom wall and with aligned opening ports to receive the strap, whereby the first end of the strap in insertable into one port to register a slot with each provided tab; and
   said means for blocking lateral movement of the strap being a second end of the strap inserted through the opposite port of the housing to fill the space available for internal movement.

4. The improvement defined in claim 1, wherein the clamp body is a longitudinal housing chamber having substantially parallel top and bottom walls, with said first means being at least one tab projecting into the chamber in a position and of a size to engage into one said through opening slot.

5. The improvement defined in claim 1, wherein the clamp body is a longitudinal housing chamber having a plurality of tabs projecting upwardly and sloped in the axial direction of the chamber, said tabs spaced equally to the spacings of said slots; said strap thereby being insertable into the chamber in one direction but restricted against reverse direction movement by mutual engagement of the tabs into the slots of the strap; and said means for drawing the second end being a drive gear carried by said clamp body for engaging said second end of the strap to draw and hold the strap together around an object.

6. The improvement defined in claim 2, wherein said clamp body is collapsable to capture the strap end with the tab extending through a slot; and
   a drive gear means carried by said clamp body for engaging said second end to draw and hold the strap tightly around an object.

7. The improvement defined in claim 1, wherein the clamp body is a longitudinal chamber having substantially parallel top and bottom walls held separated by collapsable spacing means, with at least one tab projecting from one wall toward the other with a space remaining greater than the thickness of said strap, whereby the top and bottom walls may be closed upon a strap engaged therein with the tab projecting through a slot; and
   a drive gear means carried by said clamp body for engaging said second end to draw and hold the strap tightly around an object.

8. An improvement in construction of a strap member as defined in claim 2, wherein the clamp body defines a channel dimensioned to receive the strap by insertion into the channel and the lock tab is a resilient forward sloping portion cut from the clamp body, the tab extending across the channel a distance which requires the tab to yield as the strap is inserted and snap-locks when a strap slot registers therewith.

9. The improvement defined in claim 1, wherein;
   the clamp body is a longitudinal housing chamber having substantially parallel top and bottom walls;
   said bottom wall having a series of tabs spaced to register with said series of slots and sloping in a first direction along the longitudinal axis of the body chamber;
   said top wall having a series of tabs spaced to register with said series of slots and sloping in a second direction opposite said first direction along the longitudinal axis of the body chamber;
   at least one of said walls having a through opening into said chamber with a fulcrum surface for a pry bar; and
   whereby a pry may be inserted through said opening and into a strap slot to jack the strap ahead one or more spaces to progressively tighten the strap upon the object.

10. The improvement defined in claim 1, wherein the means for drawing the second end is a worm gear in a housing removably interlocked with the clamp body and strap, whereby the worm gear is removed from the assembly after tightening.

* * * * *